G. W. MORRIS.
INDICATOR FOR OIL PUMPS.
APPLICATION FILED JAN. 15, 1916.
1,300,291.
Patented Apr. 15, 1919.
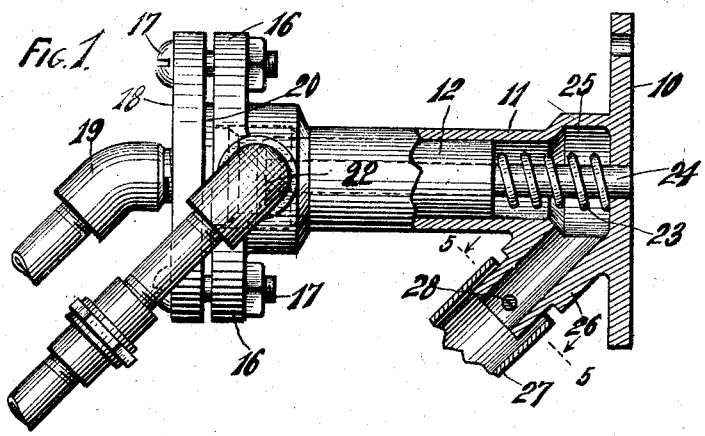
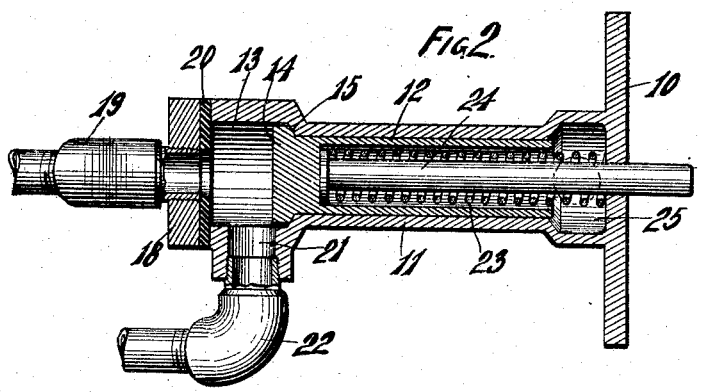
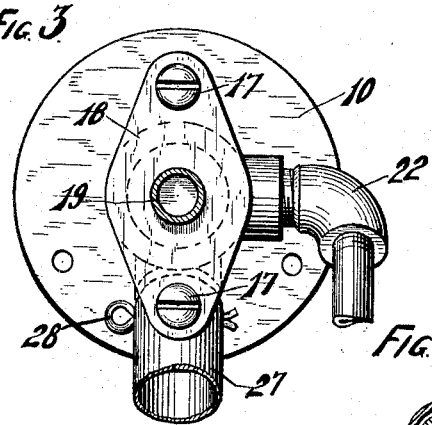
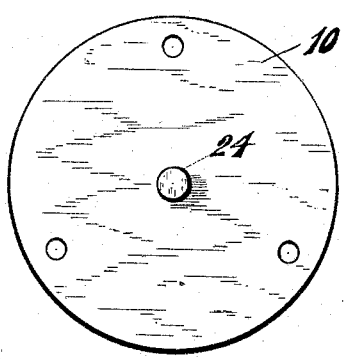
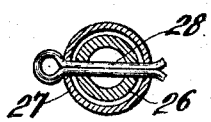
WITNESSES
INVENTOR
George W. Morris,
By R. S. Caldwell
ATTORNEY

UNITED STATES PATENT OFFICE.

GEORGE W. MORRIS, OF RACINE, WISCONSIN.

INDICATOR FOR OIL-PUMPS.

1,300,291.  Specification of Letters Patent.  Patented Apr. 15, 1919.

Continuation of application Serial No. 866,030, filed October 10, 1914. This application filed January 15, 1916. Serial No. 72,329.

*To all whom it may concern:*

Be it known that I, GEORGE W. MORRIS, a citizen of the United States, and resident of Racine, in the county of Racine and State of Wisconsin, have invented new and useful Improvements in Indicators for Oil-Pumps, of which the following is a description, reference being had to the accompanying drawings, which are a part of this specification.

This invention has for its object to provide an indicator for connection with the oil pump of an automobile engine or the like to show the proper working thereof and indicate the necessity for replenishing the oil supply when the same has become exhausted or the occurrence of any abnormal condition interfering with the proper operation of the lubricating system.

Another object of the invention is to provide such an indicator designed for use with oil pumps of the rotary type as well as oil pumps of the pulsating type.

Another object of the invention is to provide such an indicator with a plunger forming a valve tightly fitting on its valve seat when subjected to the continuous pressure from a rotary oil pump, and thereby prevent the escape of oil through the indicator.

Another object of the invention is to provide such an indicator with an enlarged chamber at the end of the plunger cylinder to collect such oil as may pass the plunger, there being a drain passage leading from such chamber to drain the oil therefrom.

Another object of the invention is to facilitate the making of pipe connections to enable the indicator to be easily installed.

Another object of the invention is to avoid the formation of projections on the front plate except that formed by the plunger stem to indicate the operation of the oil pump.

Another object of the invention is to improve generally upon the lubricating system indicator covered by my copending application Serial No. 866,030, filed October 10, 1914, of which this is a continuation.

With the above and other objects in view the invention consists in the indicator for oil pumps as herein claimed and all equivalents.

Referring to the accompanying drawings, in which like characters of reference indicate the same parts in the different views, Figure 1 is a sectional elevation of an indicator for oil pumps constructed in accordance with this invention, the plunger thereof being in its inner position, as when the oil pump is not in operation or when the supply of lubricant is exhausted;

Fig. 2 is a sectional plan view thereof with the plunger in its outer position against its valve seat, as during the impulse stroke of a plunger oil pump or during the normal operation of a rotary pump;

Fig. 3 is a rear view thereof;

Fig. 4 is a front view thereof; and,

Fig. 5 is a sectional view of the drain pipe connection on the plane of line 5—5 of Fig. 1.

In these drawings 10 indicates a front plate forming the end wall of a cylindrical casing 11 in which a plunger 12 fits to reciprocate back and forth under the influence of pressure in the lubricating system. At the rear end of the casing there is an enlarged chamber 13 containing the enlarged head 14 of the plunger which has a beveled shoulder forming a conical valve which may seat upon a conical valve seat 15 of the casing between the cylindrical bore thereof and the chamber 13. The casing at its rear end is provided with oppositely extending connecting ears 16 through which connecting bolts 17 pass for clamping to the end of the casing a connecting plate 18 which has a threaded central opening in which an elbow or other pipe connection 19 is threaded. A gasket 20 of leather or other suitable material is clamped between the faced end of the casing 11 and the connecting plate 18 to insure an oil-tight connection between them, and this gasket extends inside of the chamber 13 with an opening registering with the opening of the pipe connection 19, and thus forms a cushion against which the end of the plunger strikes at the end of its inward movement to prevent the metallic click that would be produced with each reciprocation of the plunger if it struck directly against the connecting plate 18. Leading from the chamber 13 at any convenient point, preferably from the side thereof as shown, is a discharge outlet 21 in which an elbow or other pipe connection 22 may be threaded to conduct the oil to the parts needing lubrication. This is the arrangement when the indicator is so connected as to have the stream of oil from the pump pass therethrough, as when the pipe connection 19 is connected with the pump and the pipe connection 22 is connected with the oil distributing system. When, however, the pump is connected directly with the oil distributing system and the pipe connection 14 merely forms a blind lead therefrom, an ordinary screw plug is threaded in the passageway 21. The pressure of the lubricant in the chamber 13 during the impulse stroke of a plunger oil pump or during the operation of a rotary oil pump is sufficient to move it outwardly against its seat 15, but when such pressure subsides the plunger is moved inwardly by the action of a spring 23 which is preferably contained within a bore of the plunger and bears at one end against the front plate 10 and at the other end against a flange of a plunger stem 24. The stem 24 bears against the end of the bore of the plunger to give the plunger the tendency to move rearwardly, while the other end fits in an opening through the front plate 10, and in the rear position of the plunger lies approximately flush with the face of the front plate, while in the forward position of the plunger it is projected from the front plate in the manner shown in Fig. 2 to constitute a signal or indicating means to show when the oil pump is properly performing its functions.

Although the seating of the valve-like head of the plunger on its valve seat is provided to prevent the escape of oil under pressure between the plunger and its cylinder, particularly when in use with a rotary oil pump or other oil pump supplying continuous pressure, provision is made for draining oil from the casing before it reaches the opening in the front plate should there be such a leakage. Thus the casing 11 is provided with an enlarged chamber 25 just behind the front plate, and leading from the bottom thereof is an inclined nipple 26 containing a passageway forming a drain opening. This nipple may be connected in any convenient manner with a drain pipe 27, though it is preferred to reduce the end of the nipple so that it may be freely inserted in the end of the drain pipe without the necessity for threaded connection, a cotter pin 28 passing horizontally through openings in the end of the drain pipe and in the end of the nipple serving to hold the parts in place. In any event there is no material flow of oil through the drain connection, and the loose fit of the inclined overlapping parts will be sufficient to conduct it without leakage, while the horizontal position of the cotter pin will prevent the leakage through openings provided for it. The drain pipe 27 may lead back to the crank chamber of the engine or wherever it is desired to discharge the oil drained from the plunger cylinder, its presence serving to prevent the oil reaching the plunger stem and being carried thereby through the front plate.

The front plate is intended to be placed upon the cowlboard or dash of the automobile so that it and the protruding plunger stem are the only parts visible and the movements of the plunger incident to the pressure of the flow of lubricant when the oil pump is operating properly are clearly indicated by the movements of the plunger stem through the front plate. The plunger stem will reciprocate with each impulse of the oil pump when the plunger type of oil pump is used and will remain in its projected position as long as pressure is maintained in the lubricating system by the proper operation of the pump when a rotary oil pump is used, and in the dark when the position of the plunger stem can not be seen it can be felt so that it constitutes a warning signal by which the driver is notified of the failure of the lubricating system for any reason whether it is through the exhaust of the supply of lubricant or through the failure of the pump to operate for any cause.

The pressure of the spring against the plunger is not intended to oppose any considerable resistance to the flow of lubricant, but is just sufficient to return the plunger to its rear position when there is no pressure in the lubricating system, and the plunger is caused to intercept the through passageway between the inlet connection and the outlet connection in order to insure the movement of the plunger even though there is only a light pressure in the lubricant system, as when the engine is idling or running slowly.

The pressure in the lubricating system will ordinarily vary with the speed of operation of the engine and when the engine is running at high speed and the pressure is, therefore, excessive, especially when a rotary pump is employed, it is possible that there would be a leakage of oil around the plunger but for the presence of the conical valve on the end of the plunger tightly seating on its valve seat. If during the reciprocations of the plunger, when operating with a plunger pump, there is a leakage of oil past the plunger, or if the presence of the valve is not sufficient to prevent a slight leakage around the plunger when used with a rotary pump the drain connection provided will prevent the appearance of oil on the front plate, for such oil as passes the plunger will be immediately collected in the drain chamber and will be conducted away through the drain pipe. The enlargement in the front end of the cylinder bore has a further advantage in that it permits the front end of the plunger in each stroke thereof to travel beyond the end of the cylinder bore and thus carry with it into the drain chamber the oil and particles of metal which might otherwise accumulate in the cylinder bore and in time form an obstruction limiting the movement of the plunger.

The arrangement of the connections is such as to avoid complications as much as possible, the connecting plate 18 not only serving as a convenient and inexpensive means for making connection between the inlet pipe and the casing, but avoiding the necessity for the use of a union joint, it being possible to turn the connecting plate onto the end of the pipe connection 19 until it is tight and then clamp the same to the casing by means of the clamping bolts 17. Furthermore the cotter pin connection for the drain pipe avoids the necessity for the use of a union connection therein.

The plunger stem is made separate from the plunger as a matter of convenience, and to reduce the cost of manufacture, though it remains in contact therewith and may be positively connected therewith if desired; it being separate, however, accurate correspondence between the plunger stem opening in the front plate and the axis of the cylinder is made unnecessary, as well as accurate correspondence between the axis of the plunger stem and the axis of the plunger, and the careful fitting of the parts, the separate construction allowing the plunger stem to be self alining.

The high standard set for automobile accessories makes noisy operation seriously objectionable, and in the present construction this is eliminated, the forward movement of the plunger being cushioned by the action of the spring so that the valve perhaps does not entirely reach its seat before the end of each impulse from the pump, while the rearward movement of the plunger is cushioned by its engagement with the leather gasket 20. The operation of the indicator is, therefore, quiet and without an objectionable metallic click.

While being highly efficient for the purposes intended the device is inexpensive to manufacture and is durable, requiring no attention to maintain it in operative condition, and though the details of construction as shown and described are preferred they may be modified in various respects apparent to those skilled in the art without departing from the spirit and scope of the invention.

What I claim as new and desire to secure by Letters Patent is:

1. An indicator for oil pumps and the like, comprising a casing forming a cylinder with an enlargement at its end and a valve seat between said enlargement and the bore of the cylinder, a plunger fitting in the bore of the cylinder and having an enlargement on one end forming a valve adapted to be seated on the valve seat, an oil pump connection communicating with the interior of the enlargement of the casing, a front plate on the end of the casing, there being a recess in the other end of the plunger, a flanged plunger stem within the recess and bearing at one end against the plunger with its other end passing through the front plate, and a spring surrounding the plunger stem and bearing against the flange thereof and against the front plate respectively.

2. An oil pump indicator, comprising a casing forming a cylinder, a plunger fitting therein, a plate secured to the end of the casing, a gasket between the plate and the end of the casing and adapted to be engaged by the plunger, a pump connection on the plate, and a stem for the plunger passing through the casing.

3. An indicator for oil pumps, comprising a casing forming a cylinder with an inclined drain nipple leading from the front end thereof, a plunger fitting in the casing, a pump connection at the rear end of the cylinder, a stem for the plunger passing through an opening in the casing, a drain pipe telescoping the end of the drain nipple, and a pin passing horizontally through the drain pipe and the nipple.

4. An indicator for oil pumps, comprising a casing forming a cylinder with an enlargement in the bore at each end thereof, a front plate on the front end of the casing, a plunger fitting in the cylinder with a conical valve on its end adapted to be seated at the rear end of the cylinder, a stem for the plunger passing through an opening in the front plate, a spring bearing on the plunger tending to move it rearwardly, ears projecting from the rear end of the casing, a connecting plate at the rear end of the casing, a leather gasket between the connecting from the rear end of the casing, and extending into the rear enlargement of the bore of the casing to have the end of the plunger strike thereagainst, bolts connecting the connecting plate with the ears of the casing, said connecting plate having a threaded opening, and a pump connection threaded in said opening of the connecting plate.

In testimony whereof, I affix my signature, in presence of two witnesses.

GEORGE W. MORRIS.

Witnesses:
KATHERINE HOLT,
R. S. C. CALDWELL.

Copies of this patent may be obtained for five cents each, by addressing the "Commissioner of Patents, Washington, D. C."